(12) United States Patent
Meziere

(10) Patent No.: US 10,858,946 B2
(45) Date of Patent: Dec. 8, 2020

(54) BLADED ROTOR

(71) Applicant: TURBOMECA, Bordes (FR)

(72) Inventor: Ludovic Meziere, Cauterets (FR)

(73) Assignee: Safran Helicopter Engines, Bordes (FR)

(*) Notice: Subject to any disclaimer, the term of this patent is extended or adjusted under 35 U.S.C. 154(b) by 541 days.

(21) Appl. No.: 15/101,211

(22) PCT Filed: Nov. 28, 2014

(86) PCT No.: PCT/FR2014/053071
§ 371 (c)(1),
(2) Date: Jun. 2, 2016

(87) PCT Pub. No.: WO2015/082808
PCT Pub. Date: Jun. 11, 2015

(65) Prior Publication Data
US 2016/0298468 A1    Oct. 13, 2016

(30) Foreign Application Priority Data

Dec. 6, 2013  (FR) .................................. 13 62237

(51) Int. Cl.
*F01D 5/30*  (2006.01)
*C23C 4/073*  (2016.01)
(Continued)

(52) U.S. Cl.
CPC ............ *F01D 5/3007* (2013.01); *C23C 4/073* (2016.01); *C23C 4/129* (2016.01); *F01D 5/02* (2013.01);
(Continued)

(58) Field of Classification Search
CPC .... F01D 5/3007; F01D 5/3015; F01D 5/3061; F01D 5/02; F01D 5/12; F04D 29/322;
(Continued)

(56) References Cited

U.S. PATENT DOCUMENTS 4,096,615 A * 6/1978 Cross .................. B23K 35/304
228/175
2003/0208904 A1  11/2003 Tefft
(Continued)

FOREIGN PATENT DOCUMENTS

EP    1764480 A1    3/2007
EP    1921254 A2    5/2008
(Continued)

OTHER PUBLICATIONS

Notice of Rejection issued in corresponding Japanese Application No. 2016-536700 dated Aug. 28, 2018 (4 pages).
International Search Report in corresponding International Application No. PCT/FR2014/053071 dated Mar. 4, 2015 (5 pages—English Translation included).
Examination Report in corresponding Indian Application No. 201617018984, dated Nov. 25, 2019 (6 Pages).

*Primary Examiner* — Michael Lebentritt
*Assistant Examiner* — Jesse M Prager
(74) *Attorney, Agent, or Firm* — Bookoff McAndrews, PLLC

(57) ABSTRACT

A bladed rotor comprising a rotor disk (12) presenting two front faces (14, 15) and an outer peripheral face (16), sockets (18) being provided in the outer peripheral face (16) and opening out into at least one of the front faces (14, 15). The rotor (10) comprising blades (30), each having a root (32) whereby the blade is fastened in a socket (18), an end face (31) of the root being substantially level with the front face (14) of the disk when the blade is fastened in the socket. A coating layer (40) is deposited on the disk (12) so as to cover both at least a portion of the front face (14) of the disk and at least a portion of the end face (31) of the root (32).

15 Claims, 2 Drawing Sheets

(51) Int. Cl.
  *C23C 4/129* (2016.01)
  *F01D 5/02* (2006.01)
  *F01D 5/12* (2006.01)
  *F04D 29/32* (2006.01)
  *F04D 29/34* (2006.01)
  *F04D 29/38* (2006.01)

(52) U.S. Cl.
  CPC ............. *F01D 5/12* (2013.01); *F04D 29/322* (2013.01); *F04D 29/324* (2013.01); *F04D 29/329* (2013.01); *F04D 29/34* (2013.01); *F04D 29/38* (2013.01); *F05D 2220/30* (2013.01); *F05D 2230/311* (2013.01); *F05D 2230/90* (2013.01); *F05D 2300/177* (2013.01); *Y02T 50/60* (2013.01)

(58) Field of Classification Search
  CPC ...... F04D 29/323; F04D 29/34; F04D 29/324; F04D 29/329; F04D 29/38; F05D 2230/90; F05D 2230/311; F05D 2220/30; F05D 2300/177; C23C 4/073; C23C 4/129
  See application file for complete search history.

(56) References Cited

U.S. PATENT DOCUMENTS

| | | | | |
|---|---|---|---|---|
| 2007/0202269 | A1* | 8/2007 | Potter | ........................ C23C 4/02 427/446 |
| 2012/0183404 | A1* | 7/2012 | Richter | ................. F01D 5/3061 416/213 R |
| 2013/0089412 | A1* | 4/2013 | Ali | ........................... F01D 5/02 415/173.4 |

FOREIGN PATENT DOCUMENTS

| | | |
|---|---|---|
| EP | 2299059 A2 | 3/2011 |
| EP | 2400116 A2 | 12/2011 |
| EP | 2540979 A2 | 1/2013 |
| FR | 2890684 B1 | 3/2007 |
| JP | H11-030103 A | 2/1999 |
| JP | 2005-199419 A | 7/2005 |
| JP | 2010-180460 A | 8/2010 |
| JP | 2010-180819 A | 8/2010 |
| JP | 5316042 B2 | 10/2013 |

\* cited by examiner

BLADED ROTOR

CROSS-REFERENCE TO RELATED APPLICATIONS

This application is the U.S. national phase entry under 35 U.S.C. § 371 of International Application No. PCT/FR2014/053071, filed on Nov. 28, 2014, which claims priority to French Patent Application No. 1362237, filed on Dec. 6, 2013.

TECHNICAL FIELD

The present disclosure relates to a bladed rotor.

Such a rotor may be used in a terrestrial or aviation turbine engine, and more particularly in an airplane turbojet. In the particular circumstance of an airplane turbojet, it may be a fan rotor, a compressor rotor, or a turbine rotor.

BACKGROUND

In the present disclosure, the "axial direction" corresponds to the direction of the axis of rotation of the rotor, and a "radial direction" is a direction perpendicular to that axis. Likewise, an "axial plane" is a plane containing the axis of rotation of the rotor, and a "radial plane" is a plane perpendicular to that axis.

Furthermore, unless specified to the contrary, the adjectives "inner" and "outer" are used relative to a radial direction in such a manner that an inner portion (i.e. radially inner) of an element is closer to the axis of rotation than an outer portion (i.e. radially outer) of the same element.

Finally, "upstream" and "downstream" are defined relative to the normal flow direction of fluid between the blades or the rotor (i.e. from upstream to downstream).

The present disclosure relates to a bladed rotor having a disk forming the central portion of the rotor, with blades mounted on the disk at its outer periphery. The blades are fastened to the disk by attachment systems in which the root of a blade forms a male portion of an attachment system and is held radially in the female portion of the system, which is itself formed in the outer periphery of the disk. This female portion is commonly referred to as a "socket". The blade rotor and the disk socket may be inclined relative to the axial direction. The socket opens out in the outer peripheral face of the disk and also into at least one of the axial end faces of the disk, referred to as "front" faces, thus forming a front opening. The blade is generally mounted on the disk by being slid into the socket via the front opening.

Various solutions exist for axially retaining the blade in its socket, i.e. for preventing the blade from moving axially relative to the disk. Those known solutions involve fitting separate elements such as wires or folded branches at the axial ends of the blade root, such as flared pins, or such as cheekplates fitted on the disk. By way of example, patent document FR 2 890 684 B1 describes a shim having two tabs folded against the upstream front face of the blade root. Those known solutions often increase the number of parts of the rotor and they can complicate mounting the blades on the disk. Those known solutions are sensitive to the temperature of operation and, for solutions involving folded branches or wires, they are sensitive to the quality of folding in order to avoid any opening in operation. Furthermore, they make it more difficult to inspect the sealing of the air system between the upstream and downstream faces of the rotor or inspecting the bleeding of cooling air in a rotor with cooled blades.

There therefore exists a need for a novel solution enabling the blades to be held axially relative to the disk.

GENERAL SUMMARY

The present disclosure relates to a bladed rotor comprising:

a rotor disk presenting two front faces and an outer peripheral face, sockets being provided in the outer peripheral face and opening out into at least one of the front faces; and blades, each having a root whereby the blade is fastened in a socket, an end face of the root being substantially level with the front face of the disk when the blade is fastened in the socket.

According to the proposed solution, a coating layer is deposited on the disk so as to cover both at least a portion of the front face of the disk and at least a portion of the end face of the root. The deposited coating thus establishes a connection between the blade and the disk, this connection serving to hold the blade axially relative to the disk.

As stated, the end face of the root is "substantially" level with the front face of the disk, which means that the end face may be exactly level with the front face of the root, but not necessarily. There may be an offset between these faces. Where appropriate, this offset may be compensated by a greater or lesser thickness of the coating layer.

In addition to the above-mentioned characteristics, the proposed solution may present one or more of the following characteristics, considered individually or in any technically feasible combination:

The coating layer is deposited by thermal spraying, in particular by plasma spraying, electric arc spraying, or flame spraying.

The coating layer is deposited by supersonic flame thermal spraying, in particular by high velocity oxy-fuel (HVOF) spraying, high velocity air-fuel (HVAF) spraying, or hybrid spraying.

The coating is a nickel-based alloy.

The coating is an alloy of MCrAlY type, where M corresponds to the element Fe, Ni, Co, or a mixture of these elements. The coating may thus be an alloy of NiCoCrAlYTa type.

The thickness of the coating layer lies in the range 0.5 millimeters (mm) to 1 mm.

The present disclosure also relates to a turbine engine including a bladed rotor as described above.

The characteristics and advantages of the proposed solution, and others, appear on reading the following detailed description of embodiments. This detailed description refers to the accompanying drawings.

BRIEF DESCRIPTION OF THE DRAWINGS

The accompanying drawings are diagrammatic and not to scale, and they seek above all to illustrate the principles of the invention.

In the drawings, from one figure to another, elements (or portions of an element) that are identical are identified by the same reference signs.

DETAILED DESCRIPTION OF EMBODIMENTS

Embodiments are described in detail below, with reference to the accompanying drawings. These embodiments illustrate the characteristics and the advantages of the invention. Nevertheless, it should be recalled that the invention is not limited to these embodiments.

Figure 1:
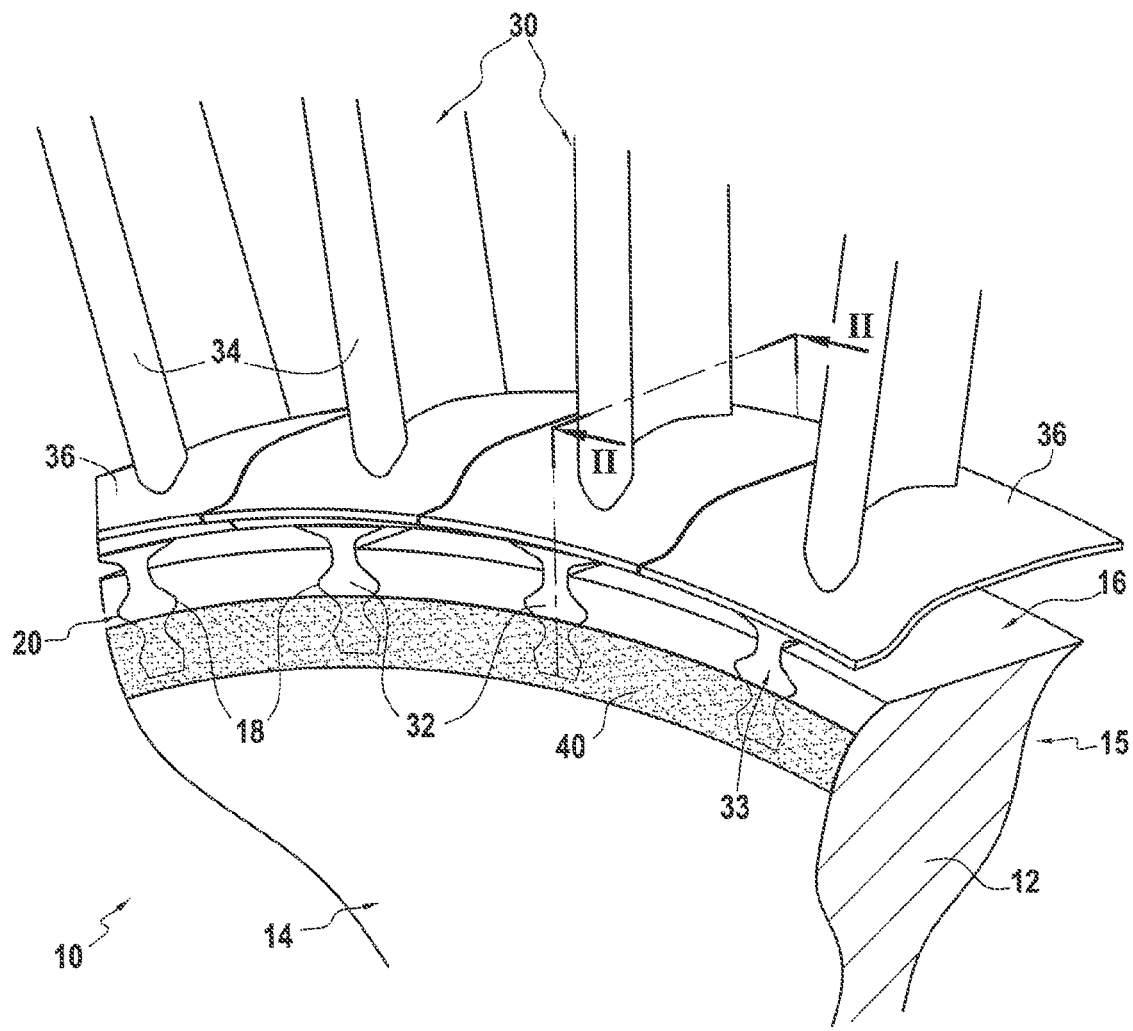
FIG. 1 is a fragmentary perspective view of an embodiment of a rotor of the present disclosure.
Figure 2:
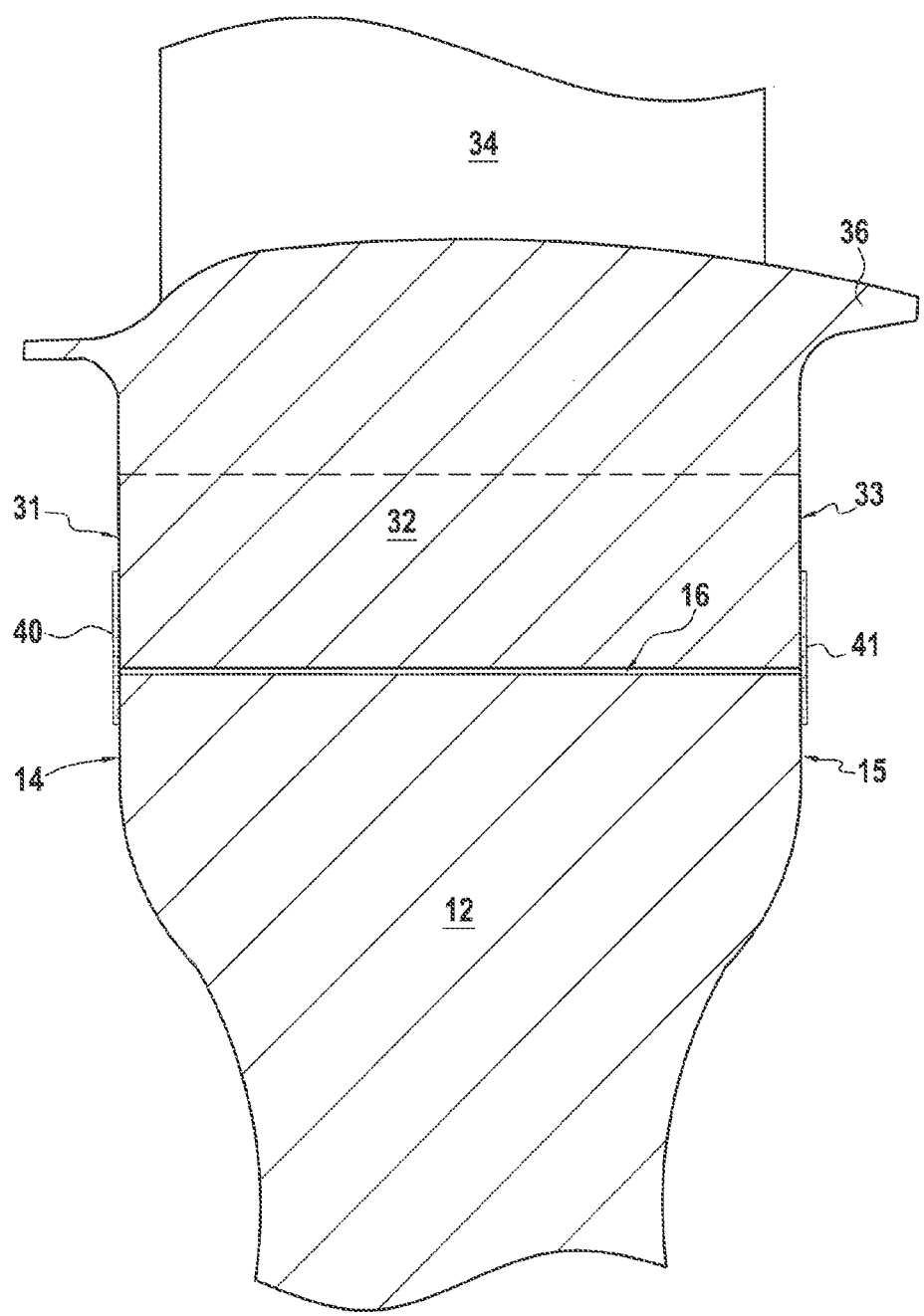
FIG. 2 is a view of the FIG. 1 rotor in section on plane II-II.

FIG. 1 is a fragmentary view of an embodiment of a bladed rotor having an axis of rotation A. In this figure, only an annular portion of the rotor is shown. The rotor 10 comprises a disk 12 having an upstream end face 14 and a downstream end face 15 that is axially opposite from the upstream face 14. These end faces are referred to as "front" faces in the present disclosure. They extend substantially radially relative to the axis A. The disk 12 also has an outer peripheral face 16 extending between its front faces.

Sockets 18 are provided in the outer peripheral face 16. These sockets 18 from grooves in the outer surface of the disk 12. These grooves may be straight or curved, parallel or inclined relative to the axis A. They open out into the outer peripheral face 16 via respective slots. Furthermore, they open out into the upstream front face 14 and/or the downstream front face via an opening 20.

The disk 12 also has blades 30 mounted at its periphery. Each blade 30 has a root 32 surmounted by an airfoil 34. In the example, a platform 36 extends circumferentially from the base of the airfoil 34. When the blades 30 are fastened on the disk 12, their platforms 36 are placed edge to edge so as to form a rotary ring defining a surface of revolution around the axis of rotation A of the disk. A particular function of this ring is to define the inside surface of the flow passage for the fluid flowing between the airfoils 34.

The blades 30 are fastened to the disk 12 by their roots 32, which roots are received in respective sockets 18. The shape of a root 32 may be complementary to the shape of a socket 18, as in the example shown where the root 32 has a Christmas-tree-shaped cross-section. Nevertheless, other shapes could be used, such as for example a dovetail shape. In a variant (not shown), the shape of the root 32 may be complementary to a portion only, and in particular to the top portion of the socket 18. This applies for example when a spacer is arranged between the root 32 and the bottom of the socket 18.

The root 32 extends from its upstream face 31 to its downstream face 33 along the same track as the socket 18. When the blade 30 is fastened in the socket 18, the end face 31 of the root 32 is level with the opening 20 and the front face 14 of the disk 12.

A coating layer 40 is deposited by thermal spraying on a portion of the front face 14 of the disk so that the coating 40 also covers a portion of the end face 31 of each root 32. In other words, the coating 40 is deposited over both the front face 14 and the end faces 31. In the example shown, an annular layer of coating 40 is deposited on the front face 14 so as to cover a low or inner portion of the openings 20 and thus the inner portions of the end faces 31. The coating 40 thus establishes a physical connection between the disk 12 and the blades 30, this connection being strong enough to oppose axial movement of the blades 30 relative to the disk 12.

The strength of the connection that is created depends on the strength specific to the coating 40 and also on the adhesion of the coating 40 on the disk 12 and the blade 30. Depositing the coating 40 by thermal spraying, and in particular by supersonic flame thermal spraying, and by way of example by HVOF spraying, contributes both to the deposited coating 40 having good mechanical strength and to its adhesion to the disk 12 and the blade 30. The adhesion of the coating 40 also depends on the affinity between the material of the coating and the material of the disk 12 and of the blade 30. By way of example, in an aviation turbine engine, of the airplane turbojet type, where the disk 12 and the blade 30 are made of a nickel-based superalloy, the coating 40 may be a nickel-based alloy, e.g. of MCrAlY type, since these materials present good affinity. The mechanical strength of the coating layer 40 also depends on its thickness. In practice, a layer having thickness lying in the range 0.5 mm to 1 mm gives a good compromise between mechanical strength and saving on material.

Another coating layer 41 may be deposited in the same manner as the coating layer 40, but on the downstream front face 15 and the end face 33 of the root 32. This coating layer 41 may be deposited in addition to the coating layer 40, as in the example shown, or it may constitute an alternative to the coating layer 41.

The embodiments described in the present disclosure are given by way of non-limiting illustration, and in the light of this disclosure, a person skilled in the art can easily modify these embodiments or envisage others, while remaining within the scope of the invention.

Furthermore, the various characteristics of these embodiments may be used alone or in combination with one another. When they are combined, the characteristics may be combined as described above or in other ways, the invention not being limited to the specific combinations designed in the present disclosure. In particular, unless specified to the contrary, a characteristic described with reference to any one embodiment may be applied in analogous manner to any other embodiment.

The invention claimed is:

1. A bladed rotor comprising:
   a rotor disk presenting two front faces and an outer peripheral face, sockets being provided in the outer peripheral face and opening out into at least one of the front faces; and
   blades, each blade having a root whereby the blade is fastened in one of the sockets, an end face of the root being level with one of the two front faces of the rotor disk when the blade is fastened in said one socket;
   wherein a coating layer forming an annular layer of coating is deposited on the rotor disk and the end face of the root so as to cover both at least a portion of said one of the two front faces of the rotor disk and at least a portion of the end face of the root, so as to establish a physical connection between the rotor disk and the blades, wherein the physical connection has a strength to oppose axial movement of the blades relative to the rotor disk, and
   wherein a thickness of the coating layer lies in a range of 0.5 mm to 1 mm.

2. A bladed rotor according to claim 1, wherein the coating layer is deposited by thermal spraying.

3. A bladed rotor according to claim 1, wherein the coating layer is deposited by supersonic flame thermal spraying.

4. A bladed rotor according to claim 1, wherein the coating layer is made of a nickel-based alloy.

5. A bladed rotor according to claim 1, wherein the coating layer is made of an alloy of MCrAlY type.

6. A turbine engine including a bladed rotor according to claim 1.

7. A bladed rotor according to claim 1, wherein the sockets open out on both of the front faces,
   another end face of the root is level with the other front face of the rotor disk when the blade is fastened in said one socket, and another coating layer is deposited on the rotor disk so as to cover both at least a portion of the other front face of the rotor disk and at least a portion of the other end face of the root.

8. A turbine engine including a bladed rotor according to claim 7.

9. A method of manufacturing a bladed rotor, the method comprising:

providing blades and a rotor disk and an end face of a root, wherein the rotor disk presents two front faces and an outer peripheral face, wherein sockets are provided in the outer peripheral face and open out into at least one of the front faces, and wherein each blade has a root whereby the blade is fastened in one of the sockets, the end face of the root being level with one of the two front faces of the rotor disk when the blade is fastened in said one socket; and depositing, on the rotor disk and each blade root, a coating layer forming an annular layer of coating so as to cover both at least a portion of said one of the two front faces of the rotor disk and at least a portion of the end face of the root, so as to establish a physical connection between the rotor disk and the blades, wherein the physical connection has a strength to oppose axial movement of the blades relative to the rotor disk, and wherein a thickness of the coating layer lies in a range of 0.5 mm to 1 mm.

10. The method according to claim 9, wherein the coating layer is deposited by thermal spraying.

11. The method according to claim 9, wherein the coating layer is deposited by supersonic flame thermal spraying.

12. The method according to claim 9, wherein the coating layer is made of a nickel-based alloy.

13. The method according to claim 9, wherein the coating layer is made of an alloy of MCrAlY type.

14. The method according to claim 9, wherein the sockets open out on both the front faces, and another end face of the root is level with the other front face of the rotor disk when the blade is fastened in said one socket, and wherein the method further comprises depositing, on the rotor disk, another coating layer so as to cover both at least a portion of the other front face of the rotor disk and at least a portion of the other end face of the root.

15. A method of manufacturing a turbine engine including a bladed rotor, the method comprising:

manufacturing a bladed rotor by the method according to claim 9; and mounting the manufactured bladed rotor in a turbine engine.

* * * * *